(No Model.)
W. G. GIBSON.
TEA OR COFFEE POT.
No. 450,932.  Patented Apr. 21, 1891.
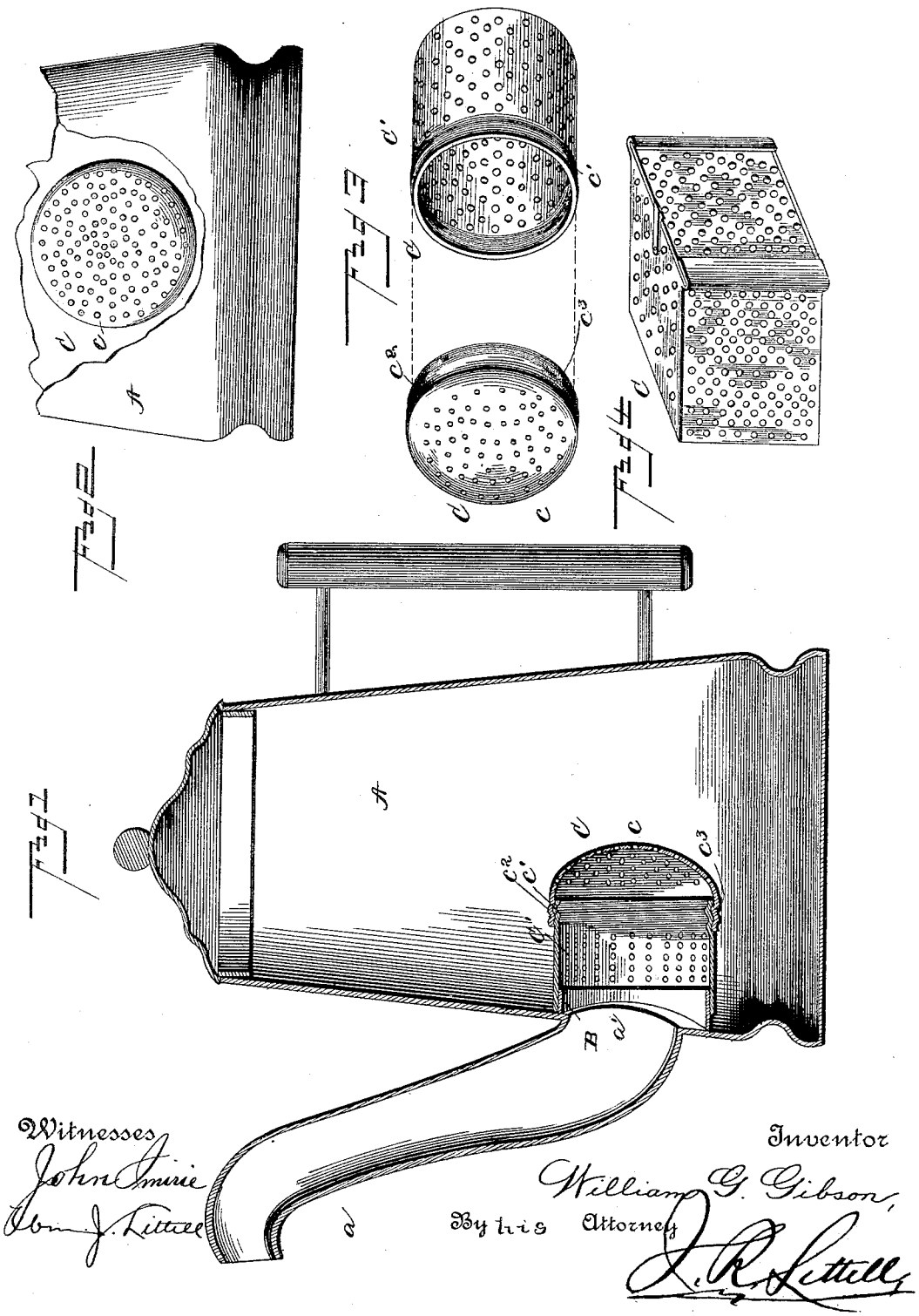
Witnesses
John Imrie
Wm. J. Littell
Inventor
William G. Gibson,
By his Attorney
J. R. Littell
THE NORRIS PETERS CO., PHOTO-LITHO., WASHINGTON, D. C.

UNITED STATES PATENT OFFICE.

WILLIAM G. GIBSON, OF ST. STEPHENS, CANADA.

TEA OR COFFEE POT.

SPECIFICATION forming part of Letters Patent No. 450,932, dated April 21, 1891.

Application filed June 13, 1890. Serial No. 355,278. (No model.)

*To all whom it may concern:*

Be it known that I, WILLIAM G. GIBSON, a citizen of the United States, residing at St. Stephens, in the Province of New Brunswick, and Dominion of Canada, have invented certain new and useful Improvements in Tea or Coffee Pots; and I do hereby declare that the following is a full, clear, and exact description of the invention, which will enable others skilled in the art to which it appertains to make and use the same.

This invention relates to tea or coffee pots, and has special relation to a strainer therefor.

The object of the invention is to provide a simple and improved strainer adapted to be removably secured within the pot over the spout-opening and of greater area than the latter, whereby choking of the spout by the tea or coffee grounds is obviated.

A further object of the invention is to provide a removable strainer of this class constructed in two sections, adapting the same to be more readily cleansed.

In the drawings, Figure 1 is a vertical longitudinal sectional view of a coffee or tea pot having my improved strainer applied thereto. Fig. 2 is a rear elevation of the same, parts being broken away to illustrate the construction. Fig. 3 is a detail perspective view of the strainer, the sections thereof being detached. Fig. 4 is a similar view of a modified form of strainer.

Corresponding parts in the figures are denoted by the same letters of reference.

Referring to the drawings, A designates a tea or coffee pot, which may be in the main of any suitable or preferred construction and provided with a spout $a$ and spout-opening $a'$. Inclosing the latter is an interior cylindrical flange B, soldered or otherwise secured to the side of the pot and projects inwardly therefrom, said flange being smooth and of much greater diameter than the opening $a'$, the purpose of which will be hereinafter set forth.

C designates the strainer, which comprises a cylindrical body portion $C'$ and a cap $c$, both of which being foraminated. The portion $C'$ is of the same diameter throughout its length, and the diameter is such as to adapt the outer end thereof to fit tightly over the flange B, thus retaining said portion in place. The inner end of the portion $C'$ is provided with screw-threads $c'$. The cap $c$ is concavo-convex in form and is provided with a peripheral flange $c^2$, formed with screw-threads $c^3$, corresponding to and adapted to engage the threads $c'$ upon the portion $C'$, whereby the cap is removable from the latter for the purpose of cleaning the strainer.

While the strainer is herein shown and described as cylindrical in form, the shape is not material and may be varied without departing from the spirit and scope of my invention. For example, the strainer may be rectangular in cross-section, as illustrated in Fig. 4. I therefore reserve the right to such modifications.

The office and advantages of my invention will be readily understood by those skilled in the art to which it appertains. The strainer serves to effectually prevent the entrance of the tea or coffee grounds into the spout, and by reason of the increased area secured in this construction of strainer liability of the same to become choked, as in the case of flat strainers, is materially lessened. The strainer can also be quickly removed from the pot and the parts comprising the former separated and thoroughly cleaned.

I claim as my invention—

In combination with a tea or coffee pot provided with an interior flange entirely inclosing the spout-opening, a removable strainer adapted to be secured over the said flange and comprising a foraminated body portion projecting within the pot and having an inner foraminated removable end, whereby the strainer entire may be removed from the flange and the parts of the strainer itself adapted to be separated for the purpose of cleansing, substantially as described.

In testimony whereof I affix my signature in presence of two witnesses.

WILLIAM G. GIBSON.

Witnesses:
GEORGE M. ROBINSON,
DANIEL MOTT.